United States Patent [19]

Tsunoda et al.

[11] 4,402,572

[45] Sep. 6, 1983

[54] PROJECTION DEVICE

[75] Inventors: Atsuo Tsunoda, Fuchu; Koyo Midorikawa, Tokyo; Hidetoshi Murase, Yokohama; Mikio Suzuta, Tokyo; Masazumi Moriwaki, Tokyo; Noritaka Mochizuki, Yokohama; Setsuo Minami, Kawasaki; Yoshiya Matsui, Yokohama, all of Japan

[73] Assignee: Canon Kabushiki Kaisha, Tokyo, Japan

[21] Appl. No.: 166,964

[22] Filed: Jul. 8, 1980

[30] Foreign Application Priority Data

Jul. 13, 1979 [JP] Japan .................. 54/89107

[51] Int. Cl.³ .................. G02B 27/62; G03G 15/04
[52] U.S. Cl. .................. 350/167; 350/589; 355/50
[58] Field of Search .................. 350/167, 65-67, 350/96.24, 96.25, 96.30, 413, 587, 589; 355/1, 50; 353/38

[56] References Cited

U.S. PATENT DOCUMENTS

| 3,503,666 | 3/1970 | Moore et al. | 350/96.24 |
| 3,580,675 | 5/1971 | Hieber et al. | 350/167 |
| 4,168,900 | 9/1979 | Adachi | 355/1 |

FOREIGN PATENT DOCUMENTS 54-123948  9/1979  Japan .................. 355/1

Primary Examiner—Bruce Y. Arnold
Attorney, Agent, or Firm—Fitzpatrick, Cella, Harper & Scinto

[57] ABSTRACT

This specification discloses a projection device in which bar lenses of plastic, each having a great length in the direction of its optical axis as compared with its effective diameter, of the lenses are arranged in the form of a predetermined array. The bar lenses are shielded from the outside atmosphere by a holding member capable of easily setting the lenses. Further, transparent plates, such as glass plates or the like, are provided at the incidence end and the emergence end to seal the holding member, so that there occurs no deterioration of the predetermined optical performance resulting from variations in the environmental humidity which would otherwise cause variations in the plastic material.

14 Claims, 19 Drawing Figures

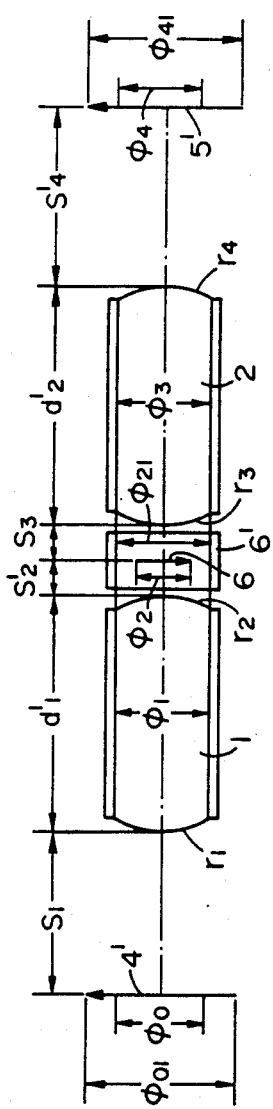
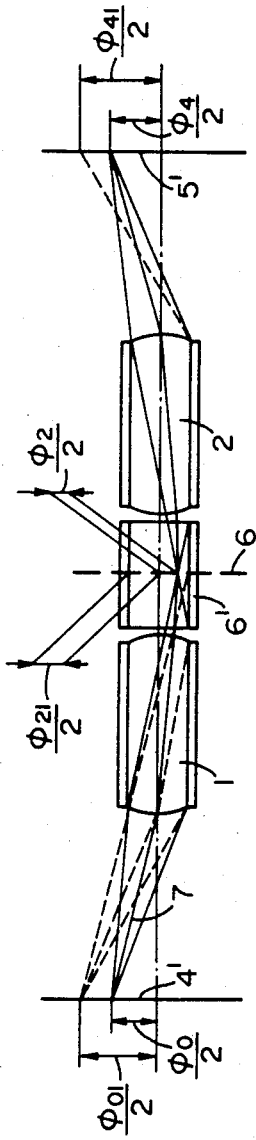
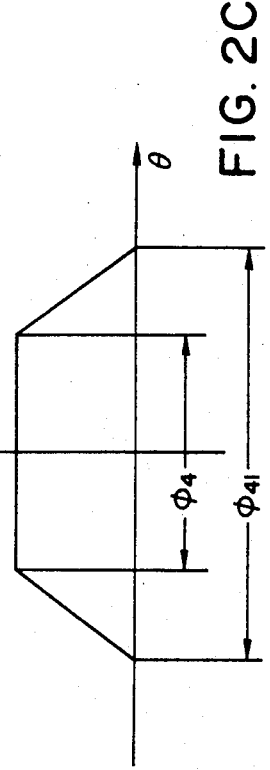
FIG. 2A
FIG. 2B
FIG. 2C

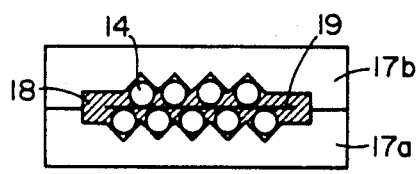
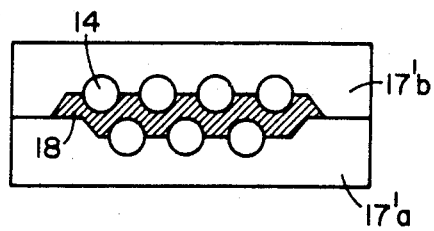
FIG. 6A          FIG. 6B
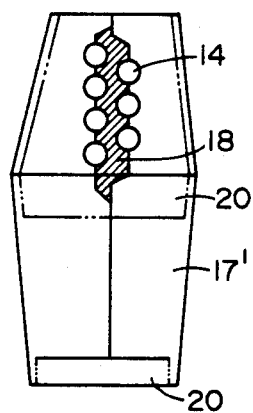
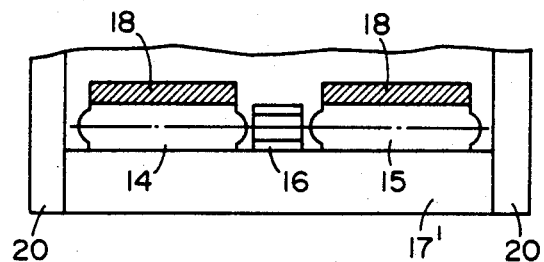
FIG. 7A          FIG. 7B
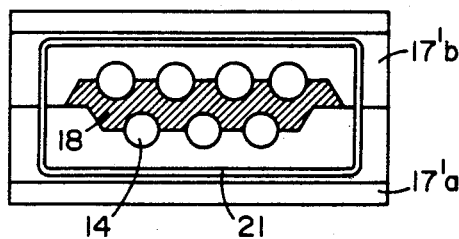
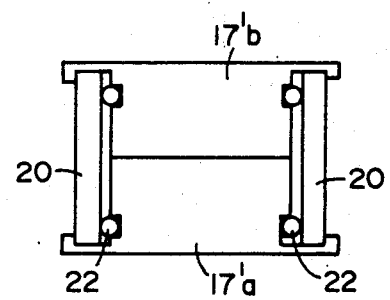
FIG. 8A          FIG. 8B

PROJECTION DEVICE

BACKGROUND OF THE INVENTION

1. Field of the Invention

This invention relates to a projection device using a plurality of bar lenses of plastic, the optical performance of which is not varied by humidity changes and the setting of which can be effected easily and accurately.

2. Description of the Prior Art

Plastic materials have a great water absorbing property or a great dewatering property and lenses formed of plastic materials have suffered from a problem such that the optical performance thereof, especially the refractive index distribution in the lenses, is varied by variations in environmental humidity. More particularly, in the refractive index distribution in a plane perpendicular to the optical axis of the plastic lenses, if the environmental humidity increases, the refractive index in the central portion tends to decrease as compared with the refractive index in the marginal portion, although the difference is not remarkable, and if the environmental humidity decreases, the refractive index in the marginal portion tends to decrease as compared with the refractive index in the central portion and therefore, when light rays pass through the lens, the light rays which originally traveled rectilinearly are bent due to the difference in the refractive index within the lens, causing non-projection of the image onto a predetermined image forming position.

The plastic employed in the invention is a lens having a greater length in the direction of the optical axis as compared with its effective diameter, as shown in our prior U.S. Application Ser. No. 889,404, now abandoned (hereinafter referred to as the bar lens). In such a lens, the distance between conjugate images in an ommateal optical system wherein a part area of the object surface is covered by a pair of bar lenses can be reduced to thereby provide a compact copying machine. Since an ommateal optical system uses a number of bar lenses, it is therefore desired that these bar lenses can be accurately and easily set in a holding member.

SUMMARY OF THE INVENTION

It is an object of the present invention to provide a projection device using plastic lenses in which the refractive index distribution in the interior of each bar lens is uniform in spite of changes in the environmental humidity, and in which a number of bar lenses can be easily and accurately set.

Such an object can be achieved by initially setting plastic lenses in groove portions or hole portions of a holding member extending in the direction of the optical axis and having a light-intercepting property, and sealing the incidence end and the emergence end by means of transparent and moisture-impervious members, such as glass plates or the like, to thereby shield the plastics lenses from the outside environment.

The invention will become fully apparent from the following detailed description thereof taken in conjunction with the accompanying drawings.

BRIEF DESCRIPTION OF THE DRAWINGS

FIGS. 2(A), (B) and (C) are optical illustrations of an element lens system.

FIGS. 6(A) and (B) are views of an ommateal bar lens system as seen from the incidence end and illustrating the prevention of stray light.

FIGS. 7(A) and (B) illustrate an embodiment for providing a moisture-proof embodiment of the invention.

FIGS. 8(A) and (B) illustrate another moisture-proof embodiment.

DESCRIPTION OF THE PREFERRED EMBODIMENTS

Figure 1:
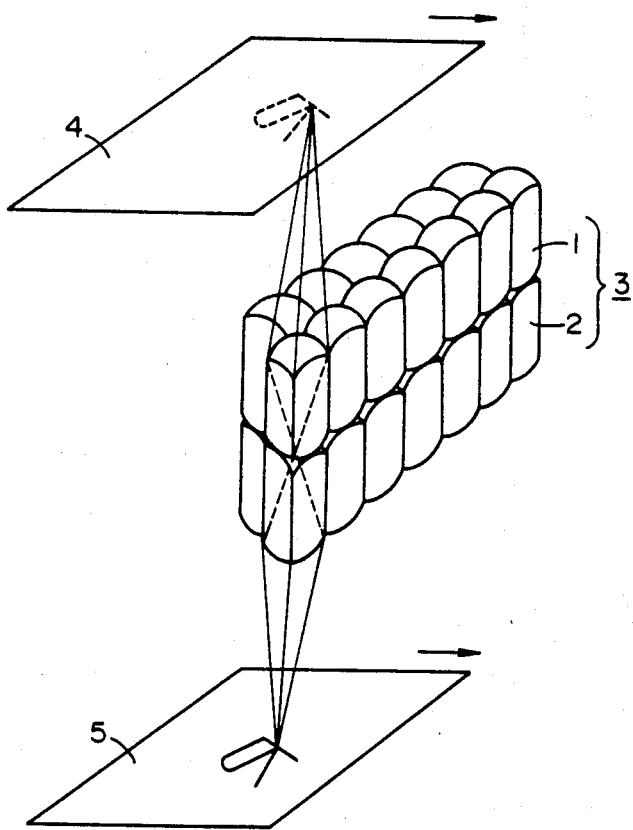
FIG. 1 is a schematic view of an ommateal bar lens system.

FIG. 1 is a schematic view of an ommateal bar lens system. First bar lenses 1 are substantially telecentric on the image side and second bar lenses 2 are substantially telecentric on the object side. Here, a substantially telecentric lens means a lens in which an emergent or incident principal light ray parallel or substantially parallel to the optical axis is obtained. The surface of the first bar lenses, on the image side thereof, and the surface of the second bar lenses, on the object side thereof, bring about the effect of a field lens action to the maximum by a telecentric system as if they formed an air lens.

An element lens system 3 is constituted in the direction of the optical axis by a first bar lens 1 and a second bar lens 2. By each element lens system 3, a partial area of an original surface 4 is erectly imaged at one-to-one magnification as a corresponding partial area of a photosensitive surface 5, which is a plane of projection. The direction of the arrangement of the element lens systems is lengthwise of the slit in a slit exposure scanning type copying machine. If the arrangement comprises one or more rows, that is, if the arrangement is made into a so-called staggered arrangement in which each row is deviated from the other row by one half pitch, the uniformity in the lengthwise direction of the slit of the exposure distribution, time-integrated in the scanning direction, will be improved. FIG. 1 shows a two-row staggered arrangement. The original surface 4 and the photosensitive surface 5 are moved at a predetermined speed in the direction of the arrow. Two types of element lens systems 3 will now be described with reference to FIGS. 2 and 3.

FIG. 2(A) is an illustration showing various elements of the bar lenses. An inverted intermediate image 6 is formed between the first bar lens 1 and the second bar lens 2.

As shown in FIG. 2(B), an image forming principal light ray 7 becomes parallel to the optical axis after having left the second surface of the first bar lens 1. An object 4' is finally imaged as an image 5'. The light intensity distribution on the image plane is uniform in a predetermined area $\phi_4$, as shown in FIG. 2(C), and the light intensity gradually decreases around the area $\phi_4$ and becomes completely zero in an area $\phi_{41}$. The transverse axis $\theta$ of FIG. 2(C) represents the angle of view.

By arranging such element lens systems at a predetermined interval, the time-integrated exposure distribution in the image plane is made uniform. Now, the various elements of the bar lenses will be described in detail.

In FIGS. 2(A) and (B), the curvature radius of the first surface of the first bar lens 1, i.e., the surface thereof which is adjacent to the object side, is expressed as $r_1$, the curvature radius of the second surface of the first bar lens, i.e., the surface thereof which is adjacent to the image side, is expressed as $r_2$ (a negative amount in the Figures), the center thickness of the lens, i.e., the thickness of the lens between the first and the second surface thereof along the optical axis, is expressed as $d_1'$, and the main refractive index of the material of this lens (i.e., the refractive index thereof for a typical design wavelength), is expressed as $n_1'$. Also, the effective diameter of this lens is represented as $\phi_1$, the size of the object 4' is represented as $\phi_0$, the size of the intermediate image 6 formed by this lens is represented as $\phi_2$, the distance from the first surface of this lens to the object 4' is expressed as $S_1$ (a negative amount in the Figures), and the distance from the second surface of this lens to the intermediate image 6 is expressed as $S_2'$. Further, the lateral magnification of the intermediate image 6 with respect to the object 4' is represented as $$\beta_1 \left( \equiv - \left| \frac{\phi_2}{\phi_0} \right| \right).$$

The effective F-number of this lens on the object side thereof is expressed as Fe.

The effective F-number determined by the illumination conditions, namely, $$Fe = \frac{\sqrt{(S_1) + \left(\frac{\phi_1}{2}\right)^2}}{\phi_1}, \quad (1)$$

and the lateral magnification $\beta_1 (|\beta_1| < 1)$ of the intermediate image set so that a part image are is not shaded. The object distance $S_1$ and the lens back $S_2'$ to the intermediate image are the values that can be preset. The main refractive index $n_1'$ of the material is determined by setting the quality of the material. From these five set amounts Fe, $\beta_1$, $S_1'$, $S_2'$ and $n_1'$, the curvature radius $r_1$ of the first surface of the first bar lens 1, the curvature radius $r_2$ of the second surface of the first bar lens, the center thickness $d_1'$ of the lens, the effective diameter $\phi_1$ of the lens and the effective part diameter $\phi_0$ of the object are determined on the basis of the following conditions by using an ideal image formation theory.

First, the relation between the magnification $\beta_1$ and the construction data of the lens is given by the following equation.

$$\beta_1 = \frac{1}{\{\Psi_1 + \Psi_2 - \Psi_1 e'_1 \Psi_2\} S_1 + \{1 - e'_1 \Psi_2\}} \quad (2)$$

where $\Psi_1 \equiv (n_1'-1)/r_1$ (refractive power of the first surface)
$\Psi_2 \equiv (1-n_1')/r_2$ (refractive power of the second surface)
$e_1' \equiv (d_1'/n_1')$ Next, the condition on which the principal ray 7 of the incident light beam from the object, namely, the light ray passing through the center of the first surface, becomes parallel to the optical axis after having left the second surface is expressed by the following relation from the fact that the second focal length (i.e., $1/\Psi_2$) is just equivalent to $e_1'$.

$$\frac{1}{\Psi_2} = e'_1 \quad (3)$$

Next, as the condition for which the light beam incident from the end of the effective object diameter $\phi_0$ onto the first bar lens 1 is not shaded, the following relation is obtained from the fact that the lower ray of the light beam travels along the edge of the first bar lens 1 parallel to the optical axis after having passed through the first surface.

$$\Psi_1 = -\frac{1}{S_1}\left(\frac{\phi_0}{\phi_1}\right) \quad (4)$$

Finally, from the condition for maintaining in advance the distance $S_2'$ from the second surface of the first bar lens 1 to the intermediate image position at a proper value, the following relation becomes necessary.

$$S'_2 = \beta_1 \times \{(1 - \Psi_1 e'_1) S_1 - e'_1\} \quad (5)$$

By simultaneously solving the conditions of equations (1) to (5) with respect to $r_1$, $r_2$; $d_1'$, $\phi_1$; $\phi_0$, the following result is primarily obtained.

$$r_1 = (n'_1 - 1) \times \frac{\beta_1 S_1}{\left[(1 - \beta_1) - \frac{S'_2}{\beta_1 S_1}\right]} \quad (6)$$

$$r_2 = (1 - n'_1) \times \beta_1 S_1 \quad (7)$$

$$d'_1 = n'_1 \times \beta_1 S_1 \quad (8)$$

$$\phi_1 = \frac{-S_1/Fe}{\sqrt{1 - \left(\frac{1}{2Fe}\right)^2}} \quad (9)$$

$$\phi_0 = \left[\frac{\left(\frac{S'_2}{\beta_1}\right) - S_1}{\beta_1 S_1}\right] \times \phi_1 \quad (10)$$

The second bar lens 2 will now be described. Similar to the foregoing description, the symbols given in FIG. 2(A) will be used.

In FIG. 2(A), the curvature radius of the first surface of the second bar lens 2, i.e., the surface thereof which is adjacent to the object side, is expressed as $r_3$, the curvature radius of the second surface of the second bar lens (i.e., the surface thereof which is adjacent to the image side), is expressed as $r_4$ (a negative amount in the Figure), the center thickness of the lens, i.e., the thickness of the lens between the first and the second surface thereof along the optical axis, is expressed as $d_2'$, and the main refractive index of the material of this lens (i.e., the refractive index thereof for a typical design wavelength), is expressed as $n_2'$. Also, the effective diameter of the lens is represented as $\phi_3$, the size of the projected image on the plane of projection for the second bar lens 2 is represented as $\phi_4$, the distance from the first surface of this lens to the intermediate image 6 is expressed as $S_3$ (which is a negative amount in the Figure), and the distance from the second surface of the second bar lens 2 to the projected image is expressed as $S_4'$. Further, the lateral magnification of the projected image 5' with respect to the intermediate image 6 is represented as $$\beta_2 \left( \equiv - \left| \frac{\phi_4}{\phi_2} \right| \right).$$

The effective F-number of this lens on the image side thereof is expressed as $Fe'$.

The effective F-number determined from the condition regarding the brightness of the projected image, namely, $$Fe' \equiv \frac{\sqrt{(S'_4)^2 + \left(\frac{\phi_3}{2}\right)^2}}{\phi_3}, \tag{11}$$

and the lateral magnification $\beta_2(|\beta_2|>1)$ of the projected image set so that a part image is not shaded, the intermediate image distance $S_4$ and the lens back $S_4'$ to the plane of projection are the values that can be preset. The main refractive index $n_2'$ of the material is determined by setting the quality of the material. From these amounts $Fe'$, $\beta_2$, $S_3$, $S_4'$ and $n_2'$, the curvature radius $r_3$ of the first surface of the second bar lens 2, the curvature radius $r_4$ of the second surface of the second bar lens, the center thickness $d_2'$ of the lens, the effective diameter $\phi_3$ of the lens and the effective part diameter $\phi_4$ of the projected image are determined on the following condition by using an ideal image formation theory.

First, the relation between the lateral magnification $\beta_2$ and the construction data of this lens is given by the following equation.

$$\frac{1}{\beta_2} = \frac{1}{\{\Psi_3 + \Psi_4 - \Psi_3 e'_2 \Psi_4\}(-S'_4) + \{1 - e'_2 \Psi_3\}} \tag{12}$$

where
$\Psi_3 \equiv (n_2'-1)/r_3$ (refractive power of the first surface)
$\Psi_4 \equiv (1-n_2')/r_4$ (refractive power of the second surface)
$e_2' \equiv d_2'/n_2'$ Next, in order that the incident light beam having a principal ray parallel to the optical axis may pass through this second bar lens without excess and deficiency for the effective diameter $\phi_3$ of this lens, it is desirable that the exit pupil lie in the second surface of this second bar lens. This requirement obtains the following relation from the fact that the focal length (i.e., $1/\Psi_3$) of the first surface is just equivalent to $e_2'$.

$$\frac{1}{\Psi_3} = e'_2 \tag{13}$$

Next, as the condition for which the light beam incident from the end of the effective intermediate image diameter $\phi_2$ onto the second bar lens 2 is not shaded, the following relation is obtained from the fact that the lower ray of the light beam travels along the edge of the second bar lens 2 parallel to the optical axis after having passed through the first surface.

$$\Psi_4 = \frac{1}{S'_4} \left( 1 + \frac{\phi_4}{\phi_3} \right) \tag{14}$$

Finally, from the condition for maintaining in advance the distance $S_3$ from the first surface of the second bar lens 2 to the intermediate image position at a proper value, the following relation becomes necessary.

$$S_3 = 1/\beta_2 \times \{(1 - \Psi_4 e'_2)S_4' + e'_2\} \tag{15}$$

By simultaneously solving the conditions of equations (11) to (15) with respect to $r_3$, $r_4$, $d_2'$, $\phi_3$ and $\phi_4$, the following result is primarily obtained.

$$r_3 = (1 - n'_2) \times \frac{S'_4}{\beta_2} \tag{16}$$

$$r_4 = (n'_2 - 1) \times \frac{S'_4/\beta_2}{\left[\left(1 - \frac{1}{\beta_2}\right) - \frac{S_3 \times \beta_2}{S'_4}\right]} \tag{17}$$

$$d'_2 = -n'_2 \times S'_4/\beta_2 \tag{18}$$

$$\phi_3 = \frac{S'_4/Fe'}{1 - \left(\frac{1}{2Fe'}\right)^2} \tag{19}$$

$$\phi_4 = \left[\frac{S_3 \beta_2 - S'_4}{S'_4/\beta_2}\right] \times \phi_3 \tag{20}$$

Thus, in the element lens system wherein the first bar lens 1 and the second bar lens 2 are coupled together, the intermediate image 6 (the size of the image diameter being $\phi_2$) of the object 4' (the object diameter being $\phi_0$) is first formed by the first bar lens 1 and subsequently, this intermediate image 6 is relayed as an erect image of a projected image diameter $\phi_4$ on the image plane 5' without losing the uniformity of the brightness. In that case, care must be taken of the fact that in order that the whole image of the object surface may be formed on the plane of projection without contradiction by arranging a plurality of element lens systems each comprising a first bar lens and a second bar lens, the element lens systems must generally be used at $\beta_1 \times \beta_2 = +1$, namely, one-to-one magnification. That is, the first bar lens 1 and the second bar lens 2 must be arranged so as to satisfy the relation that $$\beta_2 = \frac{1}{\beta_1} \tag{21}$$

In such a consideration, $Fe' = Fe$ is necessarily self-evident.

After all, in an erect one-to-one magnification element lens system wherein a first bar lens 1 and a second bar lens 2 are coupled together, if $\beta_1$ and $Fe$ are set by proper conditions for the first bar lens 1, $\beta_2$ and $Fe'$ of the second bar lens 2 will naturally be determined. However, it should be noted that $S_1$, $S_2'$ and $n_1'$ which are the other set values of the first bar lens 1 and $S_3$, $S_4'$ and $n_2'$ which are the set values of the second bar lens 2 can be determined independently one from another by proper conditions.

Now, a difference in construction between the first bar lens 1 and the second bar lens 2 would lead to the production of two types of bar lens which should be avoided from a manufacturing viewpoint.

If viewed in this light, a coaxial optical system in which two bar lenses are disposed symmetrically with respect to the intermediate image plane would occur to mind as the erect one-to-one magnification element system comprising a first bar lens and a second bar lens coupled together. Accordingly, if based on this concept, it will become possible to divert the first lens as the second lens. In this case, the various elements constituting the second lens are obtained in the following relations with the various elements constituting the first lens.

$$r_3 = -r_2, \ r_4 = -r_1, \ d'_2 = d'_1, \ n'_2 = n'_1,$$
$$\phi_3 = \phi_1, \ \phi_4 = \phi_0, \ \beta_2 = 1/\beta_1, \ S_3 = S'_2,$$
$$S'_4 = -S_1, \ Fe' = Fe.$$

By this, the projecting optical system is simplified.

Further, through actual design, the inventor has confirmed that the first bar lens 1 and the second bar lens 2 may be on the order of ±10% from the previous conditions (6)–(10) and (16)–(20), namely, on the order as represented by $$K_1 \times (n'_1 - 1) \times \frac{\beta_1 S_1}{\left[(1-\beta_1) - \frac{S'_2}{\beta_1 S_1}\right]} \leq r_1 \leq K_2 \times$$

$$(n'_1 - 1) \times \frac{\beta_1 S_1}{\left[(1-\beta_1) - \frac{S'_2}{\beta_1 S_1}\right]}$$

$$K_1 \times (1 - n'_1) \times \beta_1 S_1 \geq r_2 \geq K_2 \times (1 - n'_1) \times \beta_1 S_1$$
$$K_1 \times n'_1 \times \beta_1 S_1 \leq d'_1 \leq K_2 \times n'_1 \times \beta_1 S_1$$

$$K_1 \times \frac{(-S_1/Fe)}{\sqrt{1 - \left(\frac{1}{2Fe}\right)^2}} \leq \phi_1 \leq K_2 \times \frac{(-S_1/Fe)}{\sqrt{1 - \left(\frac{1}{2Fe}\right)^2}}$$

$$K_1 \times \left(\frac{\left(\frac{S'_2}{\beta_1}\right) - S_1}{\beta_1 S_1}\right) \times \phi_1 \leq \phi_0 \leq K_2 \times$$

$$\left(\frac{\left(\frac{S'_2}{\beta_1}\right) - S_1}{\beta_1 S_1}\right) \times \phi_1$$

$$K_1 \times (1 - n'_2) \times \frac{S'_4}{\beta_2} \leq r_3 \leq K_2 \times (1 - n'_2) \times \frac{S'_4}{\beta_2}$$

$$K_1 \times (n'_2 - 1) \times \frac{S'_4/\beta_2}{\left[\left(1 - \frac{1}{\beta_2}\right) - \frac{S_3 \times \beta_2}{S'_4}\right]} \geq r_4 \geq K_2 \times$$

$$(n'_2 - 1) \times \frac{S'_4/\beta_2}{\left[\left(1 - \frac{1}{\beta_2}\right) - \frac{S_3 \times \beta_2}{S'_4}\right]}$$

-continued $$-n'_2 \times S'_4/\beta_2 \times K_1 \leq d'_2 \leq K_2 \times (-n'_2) \times S'_4/\beta_2$$

$$\frac{S'_4/Fe'}{\sqrt{1 - \left(\frac{1}{2Fe'}\right)^2}} \times K_1 \leq \phi_3 \leq \frac{S'_4/Fe'}{\sqrt{1 - \left(\frac{1}{2Fe'}\right)^2}} \times K_2$$

$$\left[\frac{S_3 \beta_2 - S'_4}{S'_4/\beta_2}\right] \times \phi_3 \times K_1 \leq \phi_4 \leq$$

$$\left[\frac{S_3 \beta_2 - S'_4}{S'_4/\beta_2}\right] \times \phi_3 \times K_2$$

where $K_1 = 0.9$ and $K_2 = 1.1$.

Designated by 6' is an intermediate ring which will later be described.

Now, the arrangement interval $P_1$ of the element lens system can bring about uniformity of the illumination distribution within several percent by satisfying the following condition:

$$K_1 \times \frac{\phi_{01}}{2} \leq P_1 \leq K_2 \frac{\phi_{01}}{2} \ (K_1 = 0.9, K_2 = 1.1)$$

where $\phi_1$ is the effective object view field.

Figure 3A:
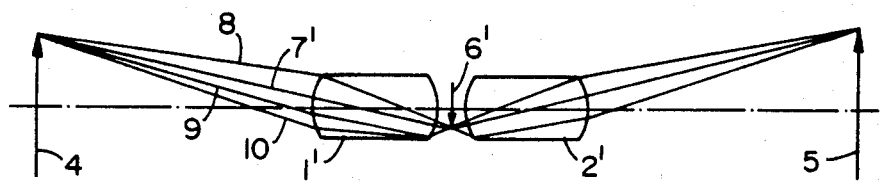
FIGS. 3(A) and (B) are optical illustrations of a different element lens system.

Another element lens system will now be described with reference to FIG. 3(A).

Figure 3B:
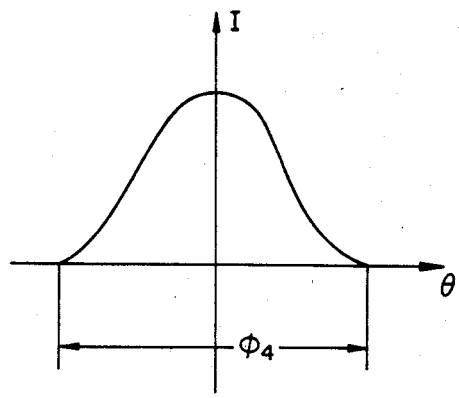

This is a system in which optical systems providing a light intensity distribution in the form of Gaussian distribution on the plane of projection are arranged in one or more parallel rows at equal intervals and the effective object view field in each component lens system overlaps multiplexly so that the distribution in the array direction with respect to the quantity of light integrated in the direction at right angles with the array direction becomes substantially flat. It is designed such that by reducing the lateral magnification of each lens constituting the element lens system, the effective object view field is made larger and the light intensity on the image plane assumes the Gaussian distribution as shown in FIG. 3(B) so that the quantity of light in the portion whereat partial projected images overlap each other becomes uniform.

The various elements of the bar lens will hereinafter be described. First, the meaning of the principal light ray which is the basis of the optical system according to the present embodiment will be explained. When the light ray incident from the end of the effective object view field onto the upper end of the first surface of the first bar lens 1' and the light ray passing from the end of the effective object view field and through the lower end of the second surface of the first bar lens 1' are considered, the light ray exiting just from the middle of the exit height of the two rays on the second surface and travelling parallel to the optical axis toward the second bar lens 2' is defined as the principal light ray and this optical system is characterized by such principal light ray.

Now, $r_1$, $r_2$, $d_1'$, $\phi_1$ and $\phi_0$ will be calculated, but first, from the definition of F-number, $$Fe = \frac{\sqrt{S_1{}^2 + \left(\frac{\phi_1}{2}\right)^2}}{\phi_1} \quad (22)$$

Also, from paraxial pursuit, $$\beta_1 = \frac{1}{(\psi_1 + \psi_2 - \psi_1 e'_1 \psi_2) S_1 + (1 - e'_1 \psi_2)} \quad (23)$$

where
$\psi_1 \equiv (n_1' - 1)/r_1$ (refractive power of the first surface)
$\psi_2 \equiv 1 - n_1'/r_2$ (refractive power of the second surface)
$e_1' \equiv (d_1'/n_1')$ Next, from the condition on which the principal ray of the effective incident light beam from the object exits parallel to the optical axis after having left the second surface, the following relations are shown:

$$\psi_2 = \frac{2}{e'_1} \quad (24)$$

$$\psi_1 = -\frac{1}{S_1} \quad (25)$$

Also, from the condition on which the opening efficiency at the maximum angle of view required becomes zero, the following relation becomes necessary.

$$\phi_0 = \frac{-2 \times S_1 \times \phi_1}{e'_1} \quad (26)$$

Finally, from the condition for maintaining in advance the distance $S_2'$ from the second surface of the first bar lens 1' to the intermediate position at a proper value, the following relation becomes necessary.

$$S'_2 = \frac{1}{\psi_2} \quad (27)$$

By solving the conditions of equations (22)–(27) with respect to $r_1$, $r_2$, $d_1'$, $\phi_1$ and $\phi_0$, the following result is primarily obtained:

$$r_1 = -(n'_1 - 1)S_1 \quad (28)$$
$$r_2 = S_1 \times \beta_1 \times (1 - n'_1) \quad (29)$$
$$d'_1 = 2 \times n'_1 \times S_1 \times \beta_1 \quad (30)$$

$$\phi_1 = \frac{-S_1/Fe}{\sqrt{1 - \left(\frac{1}{2Fe}\right)^2}} \quad (31)$$

$$\phi_0 = -\frac{\phi_1}{\beta_1} \quad (32)$$

Next, the second bar lens 2' will be described. Similar to the foregoing description, the symbols given in FIG. 2(A) will be used.

The effective F-number determined from the condition regarding the brightness of the projected image is as follows:

$$Fe' = \frac{\sqrt{(S'_4)^2 + \left(\frac{\phi_3}{2}\right)^2}}{\phi_3} \quad (33)$$

The lateral magnification $\beta_2$ ($|\beta_2| > 1$) of the projected image, the distance $S_3$ from the intermediate image to the object side surface and the lens back $S_4'$ to the plane of projection are the amounts that can be preset. Also, the main refractive index $n_2'$ of the material is determined by setting the quality of the material. From these set amounts $Fe'$, $\beta_2$, $S_3$, $S_4'$ and $n_2'$, the curvature radius $r_3$ of the first surface of the second bar lens 2', the curvature radius $r_4$ of the second surface of the second bar lens, the center thickness $d_2'$ of the second bar lens 2', the effective diameter $\phi_3$ of the second bar lens 2' and the effective part diameter $\phi_4$ of the projected image are determined on the basis of the following conditions by using an ideal image formation theory.

First, the relation between the lateral magnification $\beta_2$ and the construction data of the first bar lens 1' is given by the following equation:

$$\frac{1}{\beta^2} = \frac{1}{(\psi_3 + \psi_4 - \psi_3 e'_2 \psi_4)(-S'_4) + (1 - e'_2 \psi_3)} \quad (34)$$

where
$\psi_3 \equiv n_2' - 1/r_3$ (refractive power of the first surface)
$\psi_4 \equiv 1 - n_2'/r_4$ (refractive power of the second surface)
$e_2' \equiv d_2'/n_2'$ Next, from the condition on which the principal ray of the effective incident light beam from the object is parallel to the optical axis when it enters the first surface of the second bar lens 2', $$\psi_3 = \frac{2}{e'_2} \quad (35)$$

$$\psi_4 = \frac{1}{S'_4} \quad (36)$$

From the condition on which the opening efficiency is zero at the maximum angle of view required, the following relation becomes necessary:

$$\phi_4 = \frac{2 \times S'_4 \times \phi_3}{e'_2} \quad (37)$$

Finally, from the condition for maintaining in advance the distance $S_3$ from the first surface of the second bar lens 2' to the intermediate image position at a proper value, the following relation becomes necessary:

$$S_3 = -\frac{1}{\psi_3} \quad (38)$$

By simultaneously solving the conditions of equations (33)–(38) with respect to $r_3$, $r_4$, $d_2'$, $\phi_3$ and $\phi_4$ the following result is primarily obtained:

$$r_3 = S'_4 \times \frac{1}{\beta_2} \times (1 - n'_2)$$

$$r_4 = (1 - n'_2) \times S'_4 \quad (40)$$

$$d'_2 = -2 \times n'_2 \times S'_4 \times \frac{1}{\beta_2} \quad (41)$$

$$\phi_3 = \frac{S'_4/Fe'}{\sqrt{1 - \left(\frac{1}{2Fe'}\right)^2}} \quad (42)$$

$$\phi_4 = -\beta_2 \times \phi_3 \quad (43)$$

Thus, in the element lens system wherein the first bar lens 1' and the second bar lens 2' are coupled together, the intermediate image (the size of the image diameter being $\phi_2$) of an object (the object diameter being $\phi_0$) is first formed by the first bar lens 1' and subsequently, the intermediate image is relayed as the erect image of a projected image diameter $\phi_4$ on the image plane by the second bar lens 2'. In that case, in order that the whole image of the object surface may be formed on the plane of projection without contradiction by arranging a plurality of element lens systems each comprising a first bar lens and a second bar lens, the element lens systems must generally be used at $\beta_1 \times \beta_2 = +1$, namely, erect one-to-one magnification. That is, consideration must be given to the construction of the first bar lens 1' and the second bar lens 2' so as to satisfy the relation that $$\beta_2 = \frac{1}{\beta_1} \quad (44)$$

In such a consideration, Fe' = Fe is necessarily self-evident.

Also, similar to the previously described element lens system, by adopting $r_3 = -r_2$, $r_4 = -r_1$, $d_2' = d_1'$, $n_2' = n_1'$, $\phi_3 = \phi_1$, $\phi_4 = \phi_0$, $\beta_2 = 1/\beta_1$, $S_3 = -S_2'$, $S_4' = -S_1$ and Fe' = Fe, the projecting optical system is simplified.

Further, through experiment and design, the inventor has confirmed that the first bar lens and the second bar lens may be on the order of ±10% from the previous conditions (28)–(32) and (39)–(43), namely, on the order as represented by $$-K_2 \times S_1 \times (n'_2 - 1) \leq r_1 \leq -K_2 \times S_1 \times (n'_1 - 1)$$
$$K_2 \times S_1 \times \beta_1 \times (1 - n'_1) \leq r_2 \leq K_1 \times S_1 \times \beta_1(1 - n'_1)$$
$$2 \times K_1 \times n'_1 \times S_1 \times \beta_1 \leq d'_1 \leq 2 \times K_2 \times n'_1 \times S_1 \times \beta_1$$

$$K_1 \times \frac{-S_1/Fe}{\sqrt{1 - \left(\frac{1}{2Fe}\right)^2}} \leq \phi_1 \leq K_2 \times \frac{-S_1/Fe}{\sqrt{1 - \left(\frac{1}{2Fe}\right)^2}}$$

$$K_1 \times \frac{\phi_1}{\beta_1} \leq \phi_0 \leq -K_2 \times \frac{\phi_1}{\beta_1}$$

$$K_1 \times S'_4 \times \frac{1}{\beta_2} \times (1 - n'_2) \leq r_3 \leq K_2 \times S'_4 \times \frac{1}{\beta_2} \times (1 - n'_2)$$

$$K_2 \times S'_4 \times (1 - n'_2) \leq r_4 \leq K_1 \times S'_4 \times (1 - n'_2)$$

$$-2 \times K_1 \times n'_2 \times S'_4 \times \frac{1}{\beta_2} \leq d'_2 \leq -2 \times K_2 \times n'_2 \times S'_4 \times \frac{1}{\beta_2}$$

$$K_1 \times \frac{S'_4/Fe'}{\sqrt{1 - \left(\frac{1}{2Fe'}\right)^2}} \leq \phi_3 \leq K_2 \times \frac{S'_4/Fe'}{\sqrt{1 - \left(\frac{1}{2Fe'}\right)^2}}$$

$$K_1 \times \beta_2 \times \phi_3 \leq \phi_4 \leq -K_2 \times \beta_2 \times \phi_3$$

where $K_1 = 0.9$ and $K_2 = 1.1$.

Now, the arrangement interval $P_2$ of the element lens system can bring about uniformity of the illumination distribution within several percent by satisfying the following condition:

$$N_1 \times \phi_1 < P_2 < N_2 \times \phi_1$$

where $N_1 = 1.18$ and $N_2 = 1.36$.

Figure 4A:
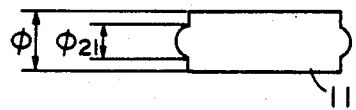
FIGS. 4(A) and (B) illustrate the shape of a bar lens.
Figure 4B:
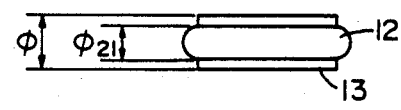

While the bar lens has been described with respect to its effective diameter, the actual bar lens configuration is as shown in FIG. 4(A) or 4(B).

The configuration shown in FIG. 4(A) is one in which the outside diameter $\phi$ is large as compared with the effective diameter $\phi_{21}$ and the portions outside of the area of the effective diameter $\phi_{21}$ at the opposite ends are made into light scattering surfaces such as coarse surfaces or light absorbing surfaces formed by black paint or the like so as to prevent light from passing therethrough. Also, the outer peripheral portion of the outside diameter of the bar lens is coated with black paint or the like so as to absorb light. By these methods, the light passing through the bar lens 11 and transmitted to the image plane is only the light beam passing through the portion within the effective diameter $\phi_{21}$. That is, the light rays having entered the first surface of the bar lens then pass beyond the area of the effective diameter $\phi_{21}$, reaching the outer peripheral portion and are thus not transmitted to the image plane.

FIG. 4(B) shows a configuration in which the outer peripheral portion of a bar lens 12 having a uniform outside diameter is coated with light-absorbent resin 13 having a refractive index substantially equal to the refractive index of the bar lens 12. For example, the bar lens 12 formed of acryl is coated with black acryl resin 13. The light passing beyond the effective diameter $\phi_{21}$ of the bar lens (the difference in refractive index is zero and so, there occurs no inner surface reflection) enters into the resin 13 and disappears therein.

Figure 5A:
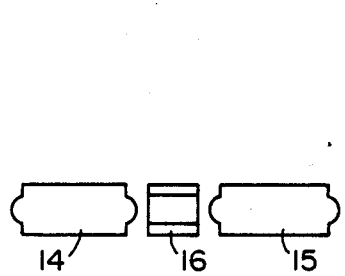
FIG. 5(A) illustrates an intermediate ring in an element lens system.

FIG. 5(a) shows the optical arrangement of the element lens system. An intermediate ring 16 is provided between the first bar lens 14 and the second bar lens 15. Some clearance is provided between the first bar lens 14 and the intermediate ring 16 and between the second bar lens 15 and the intermediate ring 16 so as to avoid direct contact therebetween. The inside diameter of the intermediate ring 16 is equal to or slightly greater than the effective diameter of the bar lenses, and delustering coating is applied to the inside diameter surface of the intermediate ring. On the other hand, the outside diameter of the intermediate ring 16 is substantially equal to the outside diameter of the bar lenses. The light that passes through the first bar lens 14 and then enters the second bar lens of another element lens system, namely, the light which would provide flare or ghost, is suppressed by the intermediate ring 16. However, depending on the photosensitive medium, some flare or the like can be neglected and in such cases, the intermediate ring may be omitted to reduce the cost.

Figure 5B:
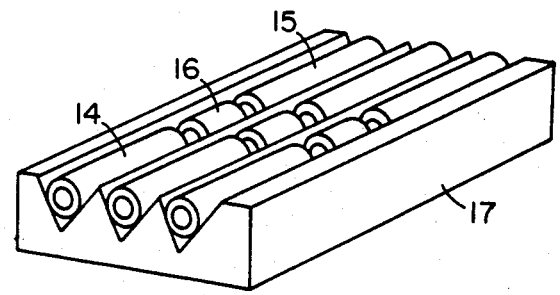
FIG. 5(B) illustrates the arrangement of element lens systems in a grooved block.

FIG. 5(B) shows the appearance of an arrangement in which element lens systems are arranged in the grooves of a grooved block 17 having V-shaped grooves. By the V-shaped grooves, the first bar lenses 14, the second bar lenses 15 and the intermediate rings 16 are simply and accurately set in a plane at right angles with the optical axis. The shape of the grooves is not limited to a V-shape, but a U-shape or other suitable shape may also be adopted. The position setting in the direction of the optical axis can be simply and accurately accomplished by initially setting a tool between the first bar lens 14 and the second bar lens 15 and causing these lenses to follow the tool. When the first bar lens 14 and the second bar lens 15 are set and adhesively secured, the intermediate ring 16 is set. FIG. 6(a) is a view of the element lens systems as seen from the incidence end and illustrating the stray light prevention. Designated by 18 is an opaque gum-like light-intercepting substance such as silicon resin filling the entire space between the element lens systems. By this, entry of stray light into this portion can be prevented. The element lens systems are arranged so as to provide a so-called staggered arrangement in which each row is deviated from the other by one half pitch with the bar lenses arranged and coupled with a sheet member 19 interposed therebetween. Instead of the sheet member 19, a gum-like light-intercepting substance may be interposed, of course. The first bar lenses 14, the second bar lenses 15 and the intermediate rings 16 are adhesively secured to the groove block 17. In FIG. 6(A), the grooved block 17 having V-shaped grooves is shown, but when it is difficult to fill the V-shaped grooves with silicon resin 18 or the like, a grooved block 17' having U-shaped grooves as shown in FIG. 6(B) would be suitable.

Figure 9A:
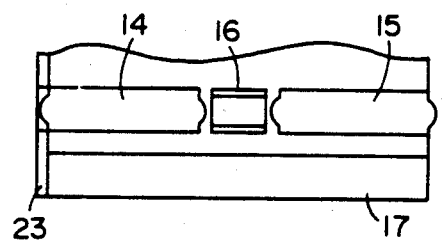
FIGS. 9(A) and (B) illustrate another form of stray light prevention.
Figure 9B:
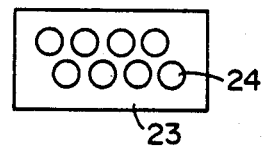

What has been described above is the projecting optical system of an ommateal bar lens system using plastic, and to prevent the optical performance thereof from being varied by environmental humidity, transparent plates 20 are adhesively secured to and seal the incidence and emergence ends of the element lens system so as to shield the element lens system from the outside atmosphere, as shown in FIG. 7(A). Also, the grooved block 17 is formed of a material such as metal which is impervious to moisture, thereby preventing moistening of the outer peripheral portion of the bar lenses. FIG. 7(B) shows a cross-section of a moisture-proof embodiment taken in the direction of the optical axis. The amount of a gum-like substance, for example, silicon resin 18, enclosed therein is controlled in advance so as not to enter the lens surface or the inner surface of the intermediate ring. To enhance the degree of sealing, seal members 22 such as O-rings are provided in a sealing groove 21 as shown in FIGS. 8(A) and (B), and the transparent plates 20 are pressed against and adhesively secured to the sealing groove. This prevents any adhesion separation which would otherwise result from the different in the thermal expansion coefficient between the grooved block 17 and the transparent plates 20. The transparent plates 20 may be ones which also serve as filters having a wavelength characteristic corresponding to the spectrum sensitivity characteristic of the photosensitive medium in a copying machine or the like or the spectrum wavelength characteristic of the light source. The means for controlling the light entering the clearance between the element lens systems is not limited to enclosing the previously described silicon rubber 18 or the like, and the provision of a mask 23 on the incidence end as shown in FIG. 9(A) may also be adopted. The shape of the mask 23 is illustrated in FIG. 9(B), wherein a plurality of openings 24 corresponding to the effective diameter of each element lens system and smaller than the outside diameter of the bar lenses but larger than the effective diameter of the bar lenses are provided correspondingly to the element lens systems.

Since the openings 24 are larger than the effective diameter of the bar lenses, the interval error or the like of the opening in the mask 23 is allowed, thus simplifying the assembly. Since the area of the bar lenses other than the effective diameter thereof is constructed so as to prevent light from passing therethrough, the opening of the mask 23 can be made larger than the effective diameter of the bar lenses. If the mask 23 is provided not only at the incidence end but also at the emergence end, the extraction of the effective light beam will become more complete. It is possible to adhesively secure transparent plates 20 to this system for the purpose of moistureproofing as shown in FIGS. 8(A) and (B) to thereby stabilize the optical performance of the plastic lens. Thus, the humidity around the bar lenses is hardly varied even by humidity variation of the outside atmosphere, thereby enabling formation of an image within a stable design allowance. Further, according to the present construction, the wiping off of any stain on the lens surface may be very simply accomplished by wiping the flat surface.

Application of a fluorine moistureproof agent to the adhesively secured portion would result in a better effect. The adhesive agent may be an epoxy agent, an acrylic agent, synthetic rubber or the like.

While description has been made of a grooved block having V-shaped grooves or the like, an ordinary square block, for example, may be formed with a number of holes into which the bar lenses may be inserted.

Figure 10:
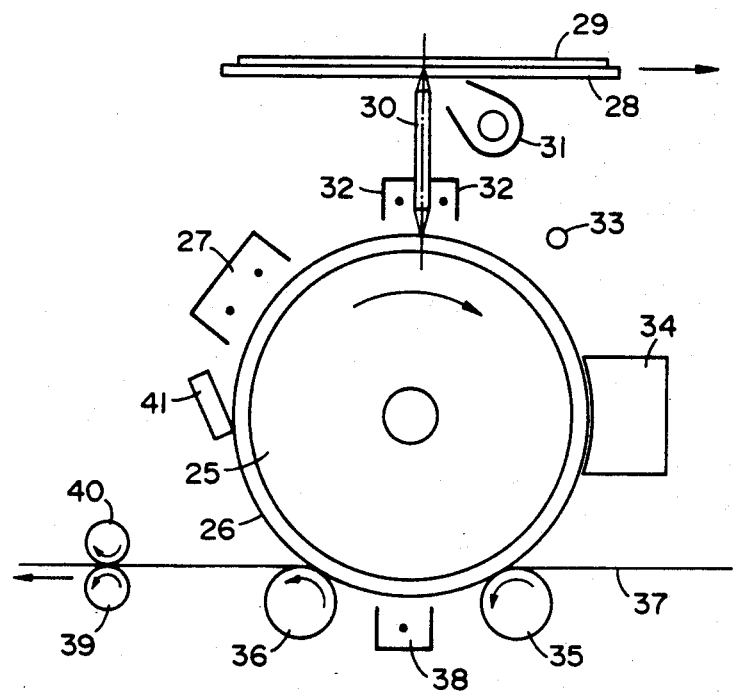
FIG. 10 illustrates the process of a system in which the present invention is applied to a copying machine.

Reference is now made to FIG. 10 to describe the process of a system in which the present invention is applied to a copying machine.

In FIG. 10, a drum 25 which is rotatively driven at a constant velocity in the direction of the arrow by a motor, not shown, has thereon a photosensitive medium 26 comprising an electrically conductive layer, a photoconductive layer and a transparent surface insulating layer, layered in the named order. The surface of this photosensitive medium 26 is first subjected to uniform charge by a corona discharger 27. The polarity of the charge is positive when said photoconductor is N-type semiconductor, and is negative when said photoconductor is p-type semiconductor. Subsequently, the photosensitive medium 26 is exposed to the image of an original 29 placed on a transparent original carriage 28 moved in the direction of the arrow at the peripheral velocity of the drum 25 multiplied by the inverse number of the image formation magnification (in the case of one-to-one magnification, a velocity equal to the peripheral velocity of the drum). This image is focused on the photosensitive medium 26 by a projection device 30. The area of the original 29 to which the projection device 30 is opposed, namely, the area of the original which is imaged on the photosensitive medium 26, is illuminated by an illumination system 31 comprising a lamp and a reflector. If, for example, the quantity of illuminating light is adjusted, the exposure amount of the photosensitive medium 26 can be adjusted.

The photosensitive medium 26 is subjected to the image exposure by the projection device 30 while at the same time it is subjected to the discharging action by a corona discharger 32 of the opposite polarity to the AC corona discharger 27, whereby a charge pattern corresponding to the optical image of the original 29 is formed on the photosensitive medium 26, the whole surface of which is further subjected to uniform exposure by a lamp 33 to form an electrostatic latent image of good contrast thereon. The latent image so formed is visualized into a toner image by a developing device 34 which is of the cascade type or the magnet brush type. This toner image is then transferred to transfer paper 37 which is fed from supply means, not shown, and brought into contact with the photosensitive medium 26 by rollers 35, 36 and transported at the same speed as the photosensitive medium 26. To enhance the image transfer efficiency, a charge opposite in polarity to the toner forming the developed image is imparted to the back side of the transfer paper 37 at the image transfer station, this being accomplished by a corona discharger 38. The toner image transferred to the transfer paper 37 is fixed by a suitable fixing device such as a heat-fixing device provided with a pair of rollers 39, 40 nipping the transfer paper therebetween, whereafter the transfer paper is conveyed to receptacle means, not shown.

After completion of the image transfer, the surface of the photosensitive medium is cleaned by the edge of an elastic blade 41 urged thereagainst to wipe off any toner remaining on said surface, thus becoming ready for another cycle of image formation process. The discharger 32 is installed so as to discharge the surface of the photosensitive medium 26 simultaneously with the exposure to the optical image, but this discharger may alternatively be disposed between the charger 27 and the image forming system so as to discharge the surface of the photosensitive medium 26 before the exposure to the optical image. In this case, the lamp 33 is unnecessary. Also, the photosensitive medium 26 may be one which has no surface insulating layer, wherein, the discharger 32 and the lamp 33 are unnecessary.

According to the present invention, there can be provided a projection device using bar lens of plastic whose position can be simply set and whose optical performance is not varied by changes in the outside atmosphere.

What we claim is:

1. A projection device comprising:
   a plurality of element lens systems, each system having a linear optical axis and having a light incidence end and a light emergence end, and said plurality of systems having their respective optical axes disposed in parallel, wherein each system comprises at least one bar lens of plastic for forming an image of a part of an object as a part of a corresponding projected image, the length of each said bar lens in the direction of the optical axis thereof being great as compared with the effective diameter of said lens;
   a holding member having said plurality of element lens systems arranged therein to form a predetermined array;
   a light-intercepting member for intercepting light beams at clearances between said element lens systems; and
   a pair of transparent plates, said plates disposed respectively at the incidence ends and the emergence ends of said systems, for passing the light beams therethrough and for coacting with said holding member to shield said element lens systems from the outside atmosphere.

2. A projection device according to claim 1, wherein said holding member is a grooved block formed with V-shaped grooves in which said element lens systems are disposed.

3. A projection device according to claim 1, wherein said light-intercepting member is an opaque, gum-like substance filling the clearance between said element lens systems.

4. A projection device according to claim 1, wherein said light-intercepting member is a mask provided at the incidence end and formed with a plurality of holes for extracting therethrough only an effective light beam.

5. A projection device according to claim 1, wherein each of said element lens systems comprises two bar lenses.

6. A projection device according to claim 1, wherein said element lens systems are arranged in two rows and in a staggered form in which the elements are deviated, one row from the other, by one half pitch as viewed from the incidence end.

7. A projection device comprising:
   a plurality of element lens systems, each system having a linear optical axis, and having a light incidence end and a light emergence end, and said plurality of systems having their respective optical axes disposed in parallel, wherein each system has two linearly disposed bar lenses for imaging a part of an object as a part of a corresponding projected image, the length of each said bar lens in the direction of the optical axis thereof being great as compared with the effective diameter of said lens;
   an intermediate ring between the two bar lenses of each said element lens system for passing an effective light beam therethrough;
   a holding member having said plurality of element lens systems arranged therein in the form of a predetermined array for shielding the axial extents of said element lens systems from the outside atmosphere;
   a light-intercepting member for preventing light beams from entering clearances between said element lens systems; and
   transparent plates, disposed at the incidence ends and at the emergence ends of said systems, for passing the light beams therethrough and for shielding the ends of said element lens systems from the outside atmosphere.

8. A projection device according to claim 7, wherein said holding member is a grooved block formed with V-shaped grooves in which said element lens systems are disposed.

9. A projection device according to claim 7, wherein said element lens systems are arranged in two rows and in a staggered form in which the elements are deviated, one row from the other, by one half pitch as viewed from the incidence end.

10. A projection device according to claim 7, wherein the first bar lens and the second bar lens as viewed from the incidence side satisfy the following formulas: (a) in the first bar lens $$K_1 \times (n'_1 - 1) \times \frac{\beta_1 S_1}{(1 - \beta_1) - \frac{S_2}{\beta_1 S_1}} \leq r_1 \leq K_2 \times$$

$$(n'_1 - 1) \times \frac{\beta_1 S_1}{(1 - \beta_1) - \frac{S_2}{\beta_1 S_1}}$$

-continued $$K_2 \times (1 - n'_1) \times \beta_1 S_1 \leq r_2 \leq K_1 \times (1 - n'_1) \times \beta_1 S_1$$

$$K_1 \times n'_1 \times \beta_1 S_1 \leq d'_1 \leq K_2 \times n'_1 \times \beta_1 S_1$$

$$K_1 \times \frac{-S_1/Fe}{\sqrt{1 - \left(\frac{1}{2Fe}\right)^2}} \leq \phi_1 \leq K_2 \times \frac{-S_1/Fe}{\sqrt{1 - \left(\frac{1}{2Fe}\right)^2}}$$

$$K_1 \times \frac{\frac{S'_2}{\beta_1} - S_1}{\beta_1 S_1} \times \phi_1 \leq \phi_0 \leq K_2 \times \frac{\frac{S'_2}{\beta_1} - S_1}{\beta_1 S_1} \times \phi_1$$

where
- $r_1$ is the curvature radius of the first surface of the first bar lens,
- $r_2$ is the curvature radius of the second surface of the first bar lens,
- $d_1'$ is the thickness of the first bar lens between the first and the second surface thereof on the optical axis,
- $\phi_1$ is the effective diameter of the first bar lens,
- $\phi_0$ is the size of the object,
- $n_1'$ is the refractive index of the medium of the first bar lens for the design wavelength,
- $\beta_1$ is the lateral magnification of the first bar lens,
- $S_1$ is the distance along the optical axis from the first surface of the first bar lens to the object surface,
- $S_2'$ is the distance along the optical axis from the second surface of the first bar lens to the intermediate image plane,
- Fe is the object said effective F-number,
- $K_1 = 0.9$, $K_2 = 1.1$ (a) in the second bar lens $$K_1 \times (1 - n'_2) \times \frac{S'_4}{\beta_2} \leq r_3 \leq K_2 \times (1 - n'_2) \times \frac{S'_4}{\beta_2}$$

$$K_2 \times (n'_2 - 1) \times \frac{S'_4/\beta_2}{\left(1 - \frac{1}{\beta_2}\right) - \frac{S_3 \times \beta_2}{S'_4}} \leq r_4 \leq K_1 \times$$

$$(n'_2 - 1) \times \frac{S'_4/\beta_2}{\left(1 - \frac{1}{\beta_2}\right) - \frac{S_3 \times \beta_2}{S'_4}}$$

$$-K_1 \times n'_2 \times S'_4/\beta_2 \leq d'_2 \leq -K_2 \times n'_2 \times S'_4/\beta_2$$

$$K_1 \times \frac{S'_4/Fe'}{\sqrt{1 - \left(\frac{1}{2Fe'}\right)^2}} \leq \phi_3 \leq K_2 \times \frac{S'_4/Fe'}{\sqrt{1 - \left(\frac{1}{2Fe'}\right)^2}}$$

$$K_1 \times \phi_3 \times \frac{S_3 \beta_2 - S'_4}{S'_4/\beta_2} \leq \phi_4 \leq K_2 \times \phi_3 \times \frac{S_3 \beta_2 - S'_4}{S'_4/\beta_2}$$

where
- $r_3$ is the curvature radius of the first surface of the second bar lens,
- $r_4$ is the curvature radius of the second surface of the second bar lens,
- $d_2'$ is the thickness of the second bar lens between the first and second surface thereof on the optical axis,
- $\phi_3$ is the effective diameter of the second bar lens,
- $\phi_4$ is the size of the projected image,
- $n_2'$ is the refractive index of the medium of the second bar lens for the design wavelength,
- $\beta_2$ is the lateral magnification of the second bar lens,
- $S_3$ is the distance along the optical axis from the first surface of the second bar lens to the intermediate image plane,
- $S_4'$ is the distance along the optical axis from the second surface of the second bar lens to the plane of projection,
- Fe' is the image side effective F-number,
- and where $K_1 = 0.9$, $K_2 = 1.1$.

11. A projection device according to claim 10, wherein $$r_3 = -r_2, \; r_4 = -r_1, \; d'_2 = d'_1, \; n'_2 = n'_1, \; \phi_3 = \phi_1, \; \phi_4 = \phi_0,$$

$$\beta_2 = \frac{1}{\beta'_1}, \; S_3 = S'_2, \; S'_4 = S_1, \text{ and } Fe' = Fe.$$

12. A projection device according to claim 7, wherein the first bar lens and the second bar lens as viewed from the incidence side satisfy the following formulas: (a) in the first bar lens $$-K_1 \times S_1 \times (n'_1 - 1) \leq r_1 \leq K_2 \times S_1 \times (n'_1 - 1)$$

$$K_2 \times S_1 \times \beta_1 \times (1 - n'_1) \leq r_2 \leq K_1 \times S_1 \times \beta_1 \times (1 - n'_1)$$

$$2 \times K_1 \times n'_1 \times S_1 \times \beta_1 \leq d'_1 \leq 2 \times K_2 \times n'_1 \times S_1 \times \beta_1$$

$$K_1 \times \frac{-S_1/Fe}{\sqrt{1 - \left(\frac{1}{2Fe}\right)^2}} \leq \phi_1 \leq K_2 \times \frac{-S_1/Fe}{\sqrt{1 - \left(\frac{1}{2Fe}\right)^2}}$$

$$-K_1 \times \frac{\phi_1}{\beta_1} \leq \phi_0 \leq -K_2 \times \frac{\phi_1}{\beta_1}$$

where $r_1$ is the curvature radius of the first surface of the first bar lens,
- $r_2$ is the curvature radius of the second surface of the first bar lens,
- $d_1'$ is the thickness of the first bar lens between the first and the second surface thereof on the optical axis,
- $\phi_1$ is the effective diameter of the first bar lens,
- $\phi_0$ is the size of the object,
- $n_1'$ is the refractive index of the medium of the first bar lens for the design wavelength,
- $\beta_1$ is the lateral magnification of the first bar lens,
- $S_1$ is the distance along the optical axis from the first surface of the first bar lens to the object surface,
- $S_2'$ is the distance along the optical axis from the second surface of the first bar lens to the intermediate image plane,
- Fe is the object side effective F-number,
- $K_1 = 0.9$, $K_2 = 1.1$, (a) in the second bar lens $$K_1 \times S'_4 \times \frac{1}{\beta_2} \times (1 - n'_2) \leq r_3 \leq K_2 \times S'_4 \times$$

$$\frac{1}{\beta_2} \times (1 - n'_2)$$

$$K_2 \times S'_4 \times (1 - n'_2) \leq r_4 \leq K_1 \times S'_4 \times (1 - n'_2)$$

$$-2 \times K_1 \times n'_2 \times S'_4 \times \frac{1}{\beta_2} \leq d'_2 \leq -2 \times K_2 \times$$

$$n'_2 \times S'_4 \times \frac{1}{\beta_2}$$

-continued $$K_1 \times \frac{S'_4/Fe'}{\sqrt{1-\left(\frac{1}{2Fe'}\right)^2}} \leq \phi_3 \leq K_2 \times \frac{S'_4/Fe'}{\sqrt{1-\left(\frac{1}{2Fe'}\right)^2}}$$

$$-K_1 \times \beta_2 \times \phi_3 \leq \phi_4 \leq -K_2 \times \beta_2 \times \phi_3$$

where

- $r_3$ is the curvature radius of the first surface of the second bar lens,
- $r_4$ is the curvature radius of the second surface of the second bar lens,
- $d_2'$ is the thickness of the second bar lens between the first and the second surface thereof on the optical axis,
- $\phi_3$ is the effective diameter of the second bar lens,
- $\phi_4$ is the size of the projected image,
- $n_2'$ is the refractive index of the medium of the second bar lens for the design wavelength,
- $\beta_2$ is the lateral magnification of the second bar lens,
- $S_3$ is the distance along the optical axis from the first surface of the second bar lens to the intermediate image plane,
- $S_4'$ is the distance along the optical axis from the second surface of the second bar lens to the plane of projection,
- Fe is the image side effective F-number.

13. A projection device according to claim 12, wherein $$r_3 = -r_2, r_4 = -r_1, d'_2 = d'_1, n'_2 = n'_1, \phi_3 = \phi_1, \phi_4 = \phi_0,$$

$$\beta_2 = \frac{1}{\beta'_1}, S_3 = S'_2, S'_4 = S_1, \text{ and } Fe' = \overline{Fe}.$$

14. A projection device comprising:
a plurality of element lens systems, each system having a linear optical axis and having a light incidence end and a light emergence end, and said plurality of systems having their respective optical axes disposed in parallel, wherein each system comprises at least one bar lens of plastic for forming an image of a part of an object as a part of a corresponding projected image, the length of each said bar lens in the direction of the optical axis thereof being great as compared with the effective diameter of said lens;
a light absorbing layer of black plastic applied to the peripheral portion of each said bar lens and having substantially the same refractive index as the material of said bar lens;
a holding member having said plurality of element lens systems arranged therein to form a predetermined array;
a light-intercepting member for intercepting light beams at clearances between said element lens systems; and
a pair of transparent plates, said plates disposed respectively at the incidence ends and the emergence ends of said systems, for passing the light beams therethrough and for coacting with said holding member to shield said element lens systems from the outside atmosphere.

* * * * *

UNITED STATES PATENT AND TRADEMARK OFFICE
CERTIFICATE OF CORRECTION

PATENT NO. : 4,402,572   Page 1 of 2

DATED : September 6, 1983

INVENTOR(S) : ATSUO TSUNODA, ET AL.

It is certified that error appears in the above-identified patent and that said Letters Patent is hereby corrected as shown below:

IN THE ABSTRACT

Line 2, change "great" to read --greater--.

Line 4, delete "of the lenses".

COLUMN 3

Line 43, after "image" (first occurrence) insert --are--;

after "image " (second occurrence) delete "are".

COLUMN 4

Equation (4), after "$\frac{1}{S_1}($" insert --1 +--.

COLUMN 8

Line 30, change "$\emptyset 1$" to read --$\emptyset 01$--.

UNITED STATES PATENT AND TRADEMARK OFFICE
CERTIFICATE OF CORRECTION

PATENT NO. : 4,402,572

DATED : September 6, 1983

INVENTOR(S) : ATSUO TSUNODA, ET AL.

It is certified that error appears in the above-identified patent and that said Letters Patent is hereby corrected as shown below:

COLUMN 10

Line 32, change "$n_2'-1/r_3$" to read -- $\dfrac{n_2'-1}{r_3}$ --.

Line 33, change "$1-n_2 1/r_4$" to read -- $\dfrac{1-n_2'}{r_4}$ --.

Signed and Sealed this

Twenty-ninth Day of May 1984

[SEAL]

Attest:

GERALD J. MOSSINGHOFF

Attesting Officer — Commissioner of Patents and Trademarks